United States Patent Office 3,317,277
Patented May 2, 1967

3,317,277
METHOD FOR PREPARING ALUMINA
PARTICLES
Lee A. Cosgrove, West Chester, Pa., assignor to Air Products and Chemicals, Inc., Philadelphia, Pa., a corporation of Delaware
No Drawing. Filed Jan. 17, 1963, Ser. No. 252,040
10 Claims. (Cl. 23—143)

This invention relates to the treatment of alumina hydrates, to produce hard, strong, spheroidal particles of alumina utilizable as contact masses for catalyzing reactions or effecting other treatment of materials in the chemical processing or petroleum refining industries, or utilizable as supports or carriers for catalytic materials which may be incorporated or applied to the particles during the preparation stage, or after conditioning treatment of the particles to improve their strength, hardness, appearance, etc. Alumina hydrate is the term most widely used to include gibbsite (alpha-alumina trihydrate); bayerite (beta-alumina trihydrate); nordstrandite; boehmite and diaspore (called alpha-alumina monohydrate and beta-alumina monohydrate respectively).

A present commercial method of forming alumina particles of the general type to which the invention relates is described in U.S. Patent No. 2,809,170 of Cornelius, Milliken and Mills. The patent discloses a method of preparing attrition-resistant alumina particles which involves the impregnation of an alumina trihydrate powder with an aqueous solution containing nitric acid, followed by pressuring, mixing, and extrusive pelleting of the mix to form green pellets of generally cylindrical shape having a minimum dimension within the range of about 2–13 mm. Subsequent conditioning treatment converts the green pellets to alumina and imparts to the finished article the desired characteristics of strength, hardness, etc. This method of manufacture produces a relatively high density particle or pellet, partly as a result of the pressuring required during the pelleting operation.

It has been found, however, that in certain commercial applications, such as in the treatment of gaseous materials, there may be a need for a more open structure, that is, lower density, in the finished pellet in order to overcome diffusion limitations with respect to the gaseous reactants while in use, and for other reasons. Also, a need for a more spherical or spheroidal configuration in the finished pellet to minimize catalyst losses through attrition. The requirement as to shape may be satisfied to some degree by subsequent rolling treatment of the extruded cylindrical pellets to round off the sharp edges and generally reshape the same to more spherical form. While some variation in density of the finished pellets may be achieved by control of the liquid content of the extrudable mix, thereby controlling the pressure requirements for extruding, there are practical limitations on the degree to which the shape or density of the pellet may be adjusted through these expedients.

Pelletizing processes and apparatus for production of nodular or spheroidal agglomerates by admixture of wettable powders with suitable liquids in a rolling or tumbling operation are well known. As more fully described in connection with certain of the embodiments of the invention disclosed in concurrently filed companion application Ser. No. 252,041, spheroidal pellets of alumina having desired low density and high porosity can be formed in conventional spheroidizing apparatus, such as those utilizing a rotating disk or pan, by controlled admixture of aqueous mineral acid wih hydrated alumina powder, preferably alumina trihydrate. To obtain the desired sphere formation by admixture of an alumina hydrate with the aqueous mineral acid on a rotating disk, for example, a greater proportion of liquids to solids is employed than is generally used in forming an extrusion mix. Such treatment produces green pellets which, on subsequent drying and dehydration, have the desired low density, but the finished pellets are poor in structural characteristics, particularly inasmuch as these pellets have relatively low crushing strength.

It has now been found that the hardness of the finished pellets formed from spheroidal agglomerates of alumina can be considerably enhanced by subjecting the green pellets, prior to their being dried and while still containing free liquid, to a post-rolling or tumbling operation for a suitable period, as up to about 2 hours, followed by suitable drying and dehydration. Preferably, the green rotund pellets are subjected to the post-rolling operation after a suitable period of aging to permit completion of the reaction between the acid and the alumina. If desired, post-rolling can be initiated after most of the acid has reacted, so that the reaction between the alumina and the acid is completed during the early part of the post-rolling operation and rolling continued for an adequate period after completion of the acid reaction.

The advantages of the post-rolling operation in accordance with the invention are attained when applied to agglomerated spheroidal masses formed from hydrated alumina and aqueous mineral acid regardless of the manner in which the green pellet is formed, provided that such rolling is applied while the mass is still in plastic state.

The powder mix from which the pellets are to be formed may comprise a pure alumina hydrate, or a combination of several alumina hydrates, and may possibly contain, in addition to these hydrates, varying amounts of other powdered materials for the purpose of imparting special characteristics to the raw mix or to the finished product, or for the purpose of facilitating or improving any of the procedural steps in making or treating the particles or pellets.

While nitric acid is to be considered a preferred binder for most applications, the invention does not exclude the use of other volatile mineral acid binders or other special liquids, with or without the addition of other solid materials to impart special properties. In using aqueous nitric acid as the liquid agglomerating agent, the reaction with alumina hydrate produces aluminum nitrate which serves as the interparticle binder imparting coherent strength to the green pellets. On subsequent dehydration and decomposition of the of the formed nitrate salt, the reconstituted alumina remains as the permanent binder in the finished pellet.

In practice of the invention, particles or pellets of alumina hydrate, or aluminum hydroxide, such as bayerite, gibbsite or boehmite, or combinations thereof, are formed by admixing the hydrate or hydrates, in powder form, with a controlled amount of an aqueous mineral acid solution of about 15–60% concentration to provide a plastic mass readily workable into the desired particle shape by known nodulizing or agglomerative spheroidizing techniques. The quantity of aqueous acid employed will vary to some extent with the specific type and composition of the hydrated alumina powder, including the particle size and particle size distribution, the total liquid generally being greater than that needed for pressure extrusion, but short of that resulting in a flowable slurry. In the case of aqueous nitric acid and a commercially available aluminum trihydroxide powder (bayerite), plastic masses forming spheroidal agglomerates by rolling techniques were obtained when using about 0.25 liter of liquid per kilo of powder. With other mineral acids, such as hydrochloric or sulfuric, the needed quantity of acid and of total liquid may vary. In a typical operation, the alumina hydrate powder is gradually fed onto a rotating 39-inch Dravo pelletizing disc and simultaneously sprayed with aqueous nitric acid which is worked into the powder to form, by rolling and tumbling action, soft spheroidal agglomerates or green pellets. The green pellets are in a particle-size range of about 40 mesh, U.S. Standard, to ¼ inch diameter.

The formed green pellets are then aged at ambient or room temperature for a time sufficient to complete the reaction between the alumina hydrate and the mineral acid to form the corresponding aluminum salt, which salt, in combination with the water, forms a pasty, interparticle, green-strength binder of the proper consistency to at least maintain the desired pellet shape and to impart sufficient cohesiveness to prevent crumbling or other damage to the untreated pellets in handling.

The aged pellets are mass tumbled, as by rolling or tumbling action in any commercial machine designed or usable for such purpose, such as a mechanical blender, for a period of up to about 2 hours in order to remove any surface roughness or loose particles as well as to eliminate inherent structural defects and to greatly improve the general appearance of the pellets.

The aged and smooth pellets are partially dried under conditions of relatively high humidity and low temperature in the range of about 150–200° F. for a short period of about several hours, and are then finish dried at about 250° F. with through circulation of air.

The dried pellets are then subjected to a standard procedure in which substantially all of the aluminum hydroxides and aluminum nitrate are decomposed to alumina. In this standard procedure the furnace temperature is held at 600° F. with a low air rate until the pellets reach a temperature of 575° F., by which time a substantial major portion of the decomposition reaction is completed. The furnace temperature is then increased to 900° F., and the pellets are brought up to this temperature and then held at such, under increased air rate, for about 2 hours, at which time the decomposition reaction is substantially complete. A typical preferred operation includes the use of air having a dew point of −40° F. and a heating rate not exceeding about 2½–3° F./minute. Upon cooling, the pellets are ready for use as a contact material, or for further treatment to incorporate special catalytic materials therein by known impregnation techniques.

An experimental investigation was made to determine the factors controlling hardness and crushing strength of spherical alumina supports or carriers formed by standard treatment in a commercial type pelletizing or nodulizing machine using a rotating disc or pan.

Powdered beta alumina trihydrate, or bayerite, of commercial grade, containing at least 90% bayerite and having a particle-size range of all through 100 mesh (U.S. Standard), 40–60% through 200 mesh, and 10% through 325 mesh, was selected as the alumina hydrate, or aluminum trihydroxide, for experimentation. The powdered material was nodulized with dilute nitric acid in a standard rotating-disc, pelletizing machine. The formed pellets were discharged from the disc as green pellets. A portion of the dry powder was balled with diluted nitric acid comprising 1 volume of acid to 3 volumes of water (1.124 sp. gr. at 60° F., or 21.4% $HNO_3$) and another portion was balled with nitric acid comprising 1 volume of acid to 1 volume of water (1.239 sp. gr. at 60° F., or 40.5% $HNO_3$).

The pellets were then aged to complete the reaction between the acid and the trihydroxide. A post-rolling treatment was applied to certain samples of the aged pellets. The post-rolling operation was carried out in a commercial type solids/solids blender having a smooth rolling surface. The rolled pellets were dried and calcined in standard drying and heating equipment. A selected portion of the finished pellets was then tested to determine the effects of such treatments on ultimate hardness, single pellet, plate-to-plate, crushing strength and general appearance.

Treatment and testing of the pellets were carried out in the following series of experiments with sample batches of fresh, so-called green pellets as discharged from the pelletizing machine. In all the experiments, the crushing strength tests were performed only on through 6, on 7 (U.S. Standard) screened samples of the finished pellets.

*Experiment I*

A sample portion of green pellets formed by addition of Carboy nitric acid (42° Baumé) diluted with 3 volumes of water to a 60° F. specific gravity of 1.125 g./cc. was placed in a sealed plastic container and permitted to stand at room temperature until the chemical reaction was completed. The pellets were not post-rolled, that is, by mass tumbling. The pellets were then placed in a lightly covered container to maintain high humidity, and the container was placed in an oven maintained at 200° F. At time intervals of 2, 4, 8, 16, 32 and 64 hrs., samples were withdrawn from the container in the oven and were finish dried at 250° F. for 2 hrs. on a screen tray, with through circulation of the hot 250° F. air. The pellets were then batch calcined in a container by circulation of −40° F. dew point air at 600° F., and at a rate of 3/10 vol. air/min./vol. of container, until the temperature of the pellets reached 575° F. The air temperature was then increased to 900° F. and the air circulation was stepped up to 1 vol. air/min./vol. of container. This treatment was continued for 2 hrs. after the pellets reached 900° F. Samples of the calcined pellets, screened to a size of through 6, on 7 mesh were tested for bulk density and crushing strength with the following results:

| Sample No. | High Humidity, Slow Drying Time, hours | Bulk Density, kg./l. | Crushing Strength, lbs. |
|---|---|---|---|
| 1 | 2 | .53 | <0.75 |
| 2 | 4 | .54 | <1.0 |
| 3 | 8 | .55 | 1.5 |
| 4 | 16 | .54 | 1.8 |
| 5 | 32 | .56 | 2.1 |
| 6 | 64 | .54 | 1.3 |

The foregoing data show that at least 8 hrs. of high-humidity, slow drying are required to have the pellets attain a degree of hardness corresponding to a crushing strength of above 1 lb. needed for practical handling.

*Experiment II*

The procedure of Experiment I was duplicated with the exception of aging time. The green pellets were aged at room temperature for only 2 hrs., instead of 96 hrs., with the following results upon testing:

| Sample No. | High Humidity, Slow Drying Time, hours | Bulk Density, kg./l. | Crushing Strength, lbs. |
|---|---|---|---|
| 1 | 2 | .56 | <1.0 |
| 2 | 4 | .56 | <0.95 |
| 3 | 8 | .56 | 1.8 |
| 4 | 16 | .54 | 1.9 |
| 5 | 32 | .56 | 1.5 |
| 6 | 64 | .54 | 1.9 |

Again, it is shown that at least 8 hrs. of high-humidity, slow drying are required to attain hardness above about one pound. It is further shown that there is no significant increase in ultimate hardness by aging for more than 2 hrs. It is evident that the beta alumina hydrate/nitric acid reaction proceeds well enough at room temperature.

*Experiment III*

To determine the effect of acid concentration, a sample of the portion of green pellets formed by addition of aqueous nitric acid diluted 1 to 1 by volume was treated identically to the procedure set forth in Experiment I, with the following results upon testing:

| Sample No. | High Humidity, Slow Drying Time, hours | Bulk Density, kg./l. | Crushing Strength, lbs. |
|---|---|---|---|
| 1 | 2 | .56 | <2.5 |
| 2 | 4 | .57 | 2.3 |
| 3 | 8 | .57 | 2.6 |
| 4 | 16 | .57 | 2.9 |
| 5 | 32 | .58 | 3.1 |
| 6 | 64 | .57 | 2.5 |

The foregoing data show the beneficial effects of the higher acid concentration. It appears that high-humidity, slow-drying times of greater than 2 hrs. have little additional effect on hardness, as applied to aggregates formed with the more concentrated acid.

*Experiment IV*

To determine the effect of high humidity drying, a portion of the pellets having the 1/1 vol. ratio of diluted nitric acid were dried at 200° F. on uncovered screen trays, with through circulation of air. The results are tabulated below.

| Sample No. | Open Screen Drying Time, hrs. | Bulk Density, kg./l. | Crushing Strength, lbs. |
|---|---|---|---|
| 1 | 17 | .55 | <0.75 |
| 2 | 24 | .56 | 0.90 |
| 3 | 90 | .56 | 0.84 |

From these experiments, it was immediately apparent that the high humidity or lightly covered drying step is critical, since none of the pellets attained a crushing strength of as much as 1 lb.

All of the pellet specimens produced by the treatments set forth in Experiments I to IV were rough surfaced, and dusted considerably.

*Experiment V*

For this experiment, a portion of the pellets formed from the mix having a 1 vol. acid/3 vol. water concentration was used.

The fresh pellets were first aged for two days at room temperature and portions were then given 1 to 8 passes through a rolling drum, each pass requiring several minutes. The rolling was done at room temperature. Samples of pellets removed after each pass were slowly dried in individual, lightly covered containers at 200° F. for 16 hrs., then finished dried for 2 hrs. at 250° F., with through circulation of air. Other portions were given only the rapid drying treatment of 2 hrs. at 250° F., with through circulation of air. The several samples were then calcined. The calcined pellets were tested for crushing strength to determine the effect of the various treatments. The results are given below:

| Sample No. | No. of Passes | High Humidity, Slow Drying | Rapid Drying | Crushing Strength, lbs. |
|---|---|---|---|---|
| 1 | 1 | (*) | (*) | <1.1 |
| 2 | 2 | (*) | (*) | 2.6 |
| 3 | 3 | (*) | (*) | 1.6 |
| 4 | 4 | (*) | (*) | 2.8 |
| 5 | 4 |  | (*) | <0.73 |
| 6 | 5 | (*) | (*) | 3.2 |
| 7 | 5 |  | (*) | >0.75 |
| 8 | 6 | (*) | (*) | 1.9 |
| 9 | 6 |  | (*) | <0.73 |
| 10 | 7 | (*) | (*) | 3.1 |
| 11 | 7 |  | (*) | <0.73 |
| 12 | 8 | (*) | (*) | <1.14 |
| 13 | 8 |  | (*) | 1.0 |

* Indicates treatment given.

The data show that little improvement in crushing strength is to be given by repeated rolling of the pellets after aging is completed, although a short rolling period is beneficial.

*Experiment VI*

A series of experiments was then carried out for the purpose of determining the effect of combining the various critical factors indicated by the previous experiments as materially contributing to the formation of a low density, hard, strong pellet.

The pellets were formed by a high acid concentration (1/1 dilution). A post-rolling treatment was given to the pellets in a Patterson-Kelley type solids/solids blender, at least a portion of which treatment was given after the chemical reaction between the acid and the bayerite had been completed. The post-rolled pellets were first slowly dried for 16 hrs. in lightly covered containers at an oven temperature of 200 °F., and then finish dried for 2 hrs. at 250° F., with through circulation of air. Standard calcination treatment was then given to complete the processing, prior to testing.

| Sample No. | Aging Time | Post Rolling | | Bulk Density, kg./l. | Crushing Strength, lbs. |
|---|---|---|---|---|---|
| | | Time, hrs. | Final Temp., °F. | | |
| 1 | 22 days | 1 | R.T. | .67 | 6.8 |
| 2 | None | 1 | 164 | .58 | 6.1 |
| 3 | do | 1 | 164 | .62 | 7.2 |
| 4 | 16 hrs. | 1 | 145 | .62 | 7.8 |
| 5 | 11 days | 1 | R.T. | .62 | 6.2 |
| 6 | do | 1 | *R.T. | .60 | 5.2 |

* With air flowing over pellets.

It appears from the foregoing data and those of the previous experiments that post-rolling at room temperature is sufficient, and there is little to be gained by the application of heat during such operation. Also, aging is not required prior to rolling. However, some portion of the post-rolling should occur after the chemical reaction has been completed. Furthermore, rolling immediately after production versus waiting until the alumina-nitric acid reaction is complete appears to have little effect, if the rolling has been done hot.

A flow of air over the pellets while rolling at room temperature, to maintain surface dryness and prevent pellet-to-pellet sticking, has no marked effect on ultimate pellet strength.

By means of the foregoing agglomerative spheroidizing and conditioning techniques it is possible to produce low density spheroidal particles or pellets of exceptional structural strength, heretofore difficult or impossible to obtain.

Obviously many modifications and variations of the invention as hereinbefore set forth may be made without departing from the spirit and scope thereof, and therefore only such limitations should be imposed as are indicated in the appended claims.

What is claimed is:

1. The method of preparing hard, strong, spheroidal pellets of alumina useful as contact and catalyst support material which comprises the successive steps of:
   (a) agglomerating a mixture of powdered alumina hydrate and 15–16% concentration aqueous mineral acid;
   (b) aging the green agglomerates at ambient temperature to further the reaction between the acid and the alumina hydrate, thereby forming an alumina salt serving as an interparticle binder;
   (c) continuously mass tumbling the aged green agglomerates at ambient temperature, and while still in plastic state containing free liquid, for a period up to about 2 hours, to smooth the surface of and to strengthen said agglomerates at least a portion of the tumbling being effected after complete reaction between the acid and the alumina hydrate has taken place;

(d) stage drying the tumbled agglomerates, first slowly under relatively high humidity conditions and then more rapidly under conditions of lower humidity and increased temperature; and
(e) calcining the dried pellets to reconstitute the alumina in said agglomerates by decomposing the aluminum salt.

2. The method of claim 1, in which said alumina hydrate comprises a trihydrate of alumina and said mineral acid is aqueous nitric acid.

3. The method of claim 2, in which said nitric acid is in a 35–45% concentration.

4. The method as in claim 3, in which said trihydrate of alumina is bayerite.

5. The method of claim 3, in which said trihydrate of alumina is gibbsite.

6. The method of claim 1, in which said alumina hydrate is boehmite.

7. The method of claim 1, in which said aging is completed before initiating said step (c) of mass tumbling.

8. The method of claim 1, in which said mass tumbling is initiated after most of said reaction between the acid and the alumina hydrate has been effected.

9. The method of claim 1, in which the slow drying is carried out at a temperature in the range of about 150–200° F. and for a period of about several hours, and the rapid drying is carried out at a temperature of about 250° F., with through circulation of air.

10. The method of claim 9, in which said calcining of the dried pellets is accomplished, first, with circulation of air at about 600° F. until the pellets reach a temperature of about 575° F., and then with increased circulation of air at about 900° F. for about 2 hours.

References Cited by the Examiner
UNITED STATES PATENTS

| | | | |
|---|---|---|---|
| 2,809,170 | 10/1957 | Cornelius et al. | 23—143 X |
| 2,950,169 | 8/1960 | Murray et al. | 23—143 |
| 3,185,651 | 5/1965 | Bose et al. | 23—1414 X |

OSCAR R. VERTIZ, *Primary Examiner.*

H. T. CARTER, *Assistant Examiner.*